United States Patent
Zhu et al.

(10) Patent No.: US 9,891,366 B2
(45) Date of Patent: Feb. 13, 2018

(54) BACKLIGHT MODULE

(71) Applicant: WISTRON CORP., New Taipei (TW)

(72) Inventors: Yan-Fei Zhu, New Taipei (TW);
Meng-Li Song, New Taipei (TW)

(73) Assignee: WINSTRON CORP., New Taipei (TW)

( * ) Notice: Subject to any disclaimer, the term of this patent is extended or adjusted under 35 U.S.C. 154(b) by 254 days.

(21) Appl. No.: 14/625,459

(22) Filed: Feb. 18, 2015

(65) Prior Publication Data

US 2016/0103265 A1  Apr. 14, 2016

(30) Foreign Application Priority Data

Oct. 10, 2014 (CN) .......................... 2014 1 0531441

(51) Int. Cl.
*F21V 7/04* (2006.01)
*F21V 8/00* (2006.01)

(52) U.S. Cl.
CPC .......... *G02B 6/0031* (2013.01); *G02B 6/002* (2013.01); *G02B 6/0016* (2013.01); *G02B 6/0083* (2013.01)

(58) Field of Classification Search
CPC ..... G02B 6/002; G02B 6/0016; G02B 6/0083
USPC ...................... 362/609, 97.1, 602
See application file for complete search history.

(56) References Cited

U.S. PATENT DOCUMENTS

| 8,931,943 B2 * | 1/2015 | Kunimochi | G02B 6/0011 362/609 |
| 2001/0013911 A1 * | 8/2001 | Kim | G02B 6/0036 349/65 |
| 2007/0230217 A1 * | 10/2007 | Sakaki | G02B 6/0031 362/624 |
| 2008/0218661 A1 * | 9/2008 | Tsai | G02B 6/0083 349/65 |

(Continued)

FOREIGN PATENT DOCUMENTS

| CN | 102767759 A | 11/2012 |
| CN | 203365859 U | 12/2013 |
| KR | 10-2009-0054722 A | 6/2009 |

OTHER PUBLICATIONS

Office Action dated Oct. 15, 2015 in Taiwan Appl. No. 103139644 (English Translation).

(Continued)

*Primary Examiner* — Elmito Breval
*Assistant Examiner* — Jessica M Apenteng
(74) *Attorney, Agent, or Firm* — Maschoff Brennan (57) ABSTRACT

A backlight module includes a bottom plate, a light guide and a light source assembly. The bottom plate has a first loading surface and a recess adjacent to each other. The recess has a second loading surface and a reflective surface inclined to the first and second loading surfaces. The light guide has a light inputting surface and a light outputting surface. The light guide is disposed on the first loading surface and covers the reflective surface. The light outputting surface faces away from the bottom plate. The light (Continued)

source assembly has a light emitting surface and disposed on the second loading surface. The light emitting surface faces the light inputting surface and the reflective surface, and comprises a side edge away from the second loading surface. The light source assembly is disposed inside the recess so the side edge is not higher than the light outputting surface.

21 Claims, 10 Drawing Sheets

(56) References Cited

U.S. PATENT DOCUMENTS

| | | | |
|---|---|---|---|
| 2013/0044514 A1* | 2/2013 | Chang | G02B 6/0028 362/609 |
| 2013/0057779 A1* | 3/2013 | Takata | G02F 1/133308 348/790 |

OTHER PUBLICATIONS

Office Action dated Jun. 28, 2017 in Chinese Appl. No. 201410531441.4 (English Translation).

\* cited by examiner

BACKLIGHT MODULE

CROSS-REFERENCE TO RELATED APPLICATIONS

This non-provisional application claims priority under 35 U.S.C. § 119(a) on Patent Application No(s). 201410531441.4 filed in China on Oct. 10, 2014, the entire contents of which are hereby incorporated by reference.

TECHNICAL FIELD

The disclosure relates to a backlight module, and more particularly to a backlight module preventing from light leak.

BACKGROUND

A backlight module comprises a light guide and a light source. The light source, located at a side of the light guide, emits light to travel through the light guide. The light guide is used for guiding the light so as to enhance the brightness of the display panel and make the image display uniformly.

In order to reduce a thickness of a tablet computer, a laptop computer or a display panel, the light guide of the backlight module thereof is thinned down in recent years in order to satisfy the demand for consumers. However, when the thickness of the light guide is reduced, the dimension of a light inputting surface of the light guide is smaller than that of a light emitting surface of the light source. In other words, the light inputting surface of the light guide cannot completely correspond to the light emitting surface of the light source, which leaks a part of the light from the light source, thereby decreasing the efficiency of illumination. Hence, the problem of the light leak between the light source and the thinned-down light guide needs to be solved by manufacturers in order to enhance the efficiency and the uniformity of the illumination of the backlight module.

SUMMARY

An aspect of the disclosure provides a backlight module comprising a bottom plate, a light guide and a light source assembly. The bottom plate has a first loading surface and a recess adjacent to a side of the first loading surface. The recess comprises a second loading surface and a reflective surface. The reflective surface is located between the first loading surface and the second loading surface. The reflective surface is inclined to the first loading surface and the second loading surface. The light guide has a light inputting surface and a light outputting surface that are connected to each other. The light guide is disposed on the first loading surface of the bottom plate. One side of the light guide covers the reflective surface which is inclined such that the light inputting surface is located above the recess, and the light outputting surface faces away from the bottom plate. The light source assembly has at least one light emitting surface. The light source assembly is disposed on the second loading surface. The light emitting surface faces the light inputting surface and the reflective surface. The light emitting surface comprises a side edge which is away from the second loading surface. The light source assembly is disposed inside the recess such that the side edge of the light emitting surface is not higher than the light outputting surface of the light guide.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein:

FIG. 4 is a cross-sectional view of the backlight module of FIG. 1 with light traveling through;

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
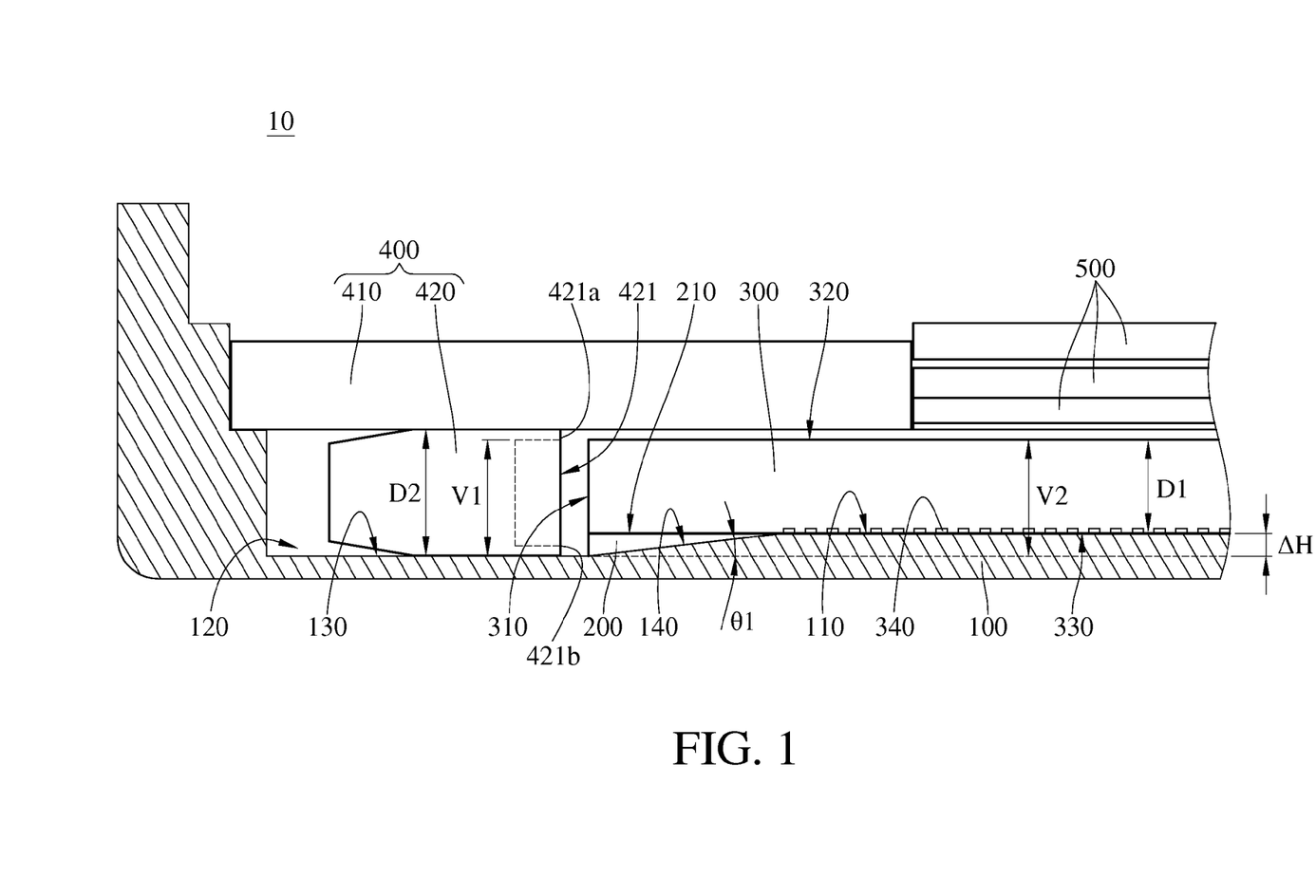
FIG. 1 is a cross-sectional view of a backlight module according to a first embodiment of the disclosure.
Figure 2:
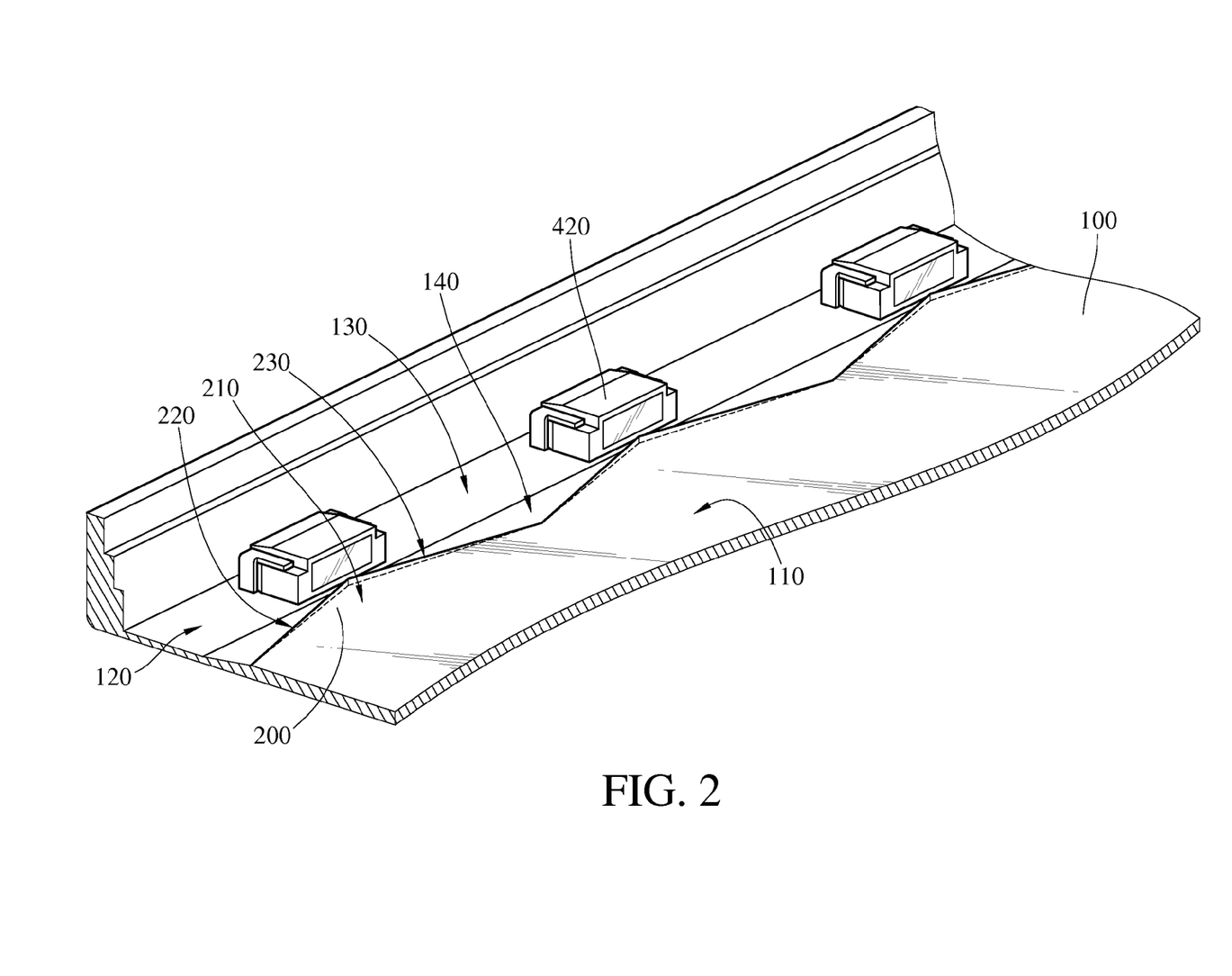
FIG. 2 is a partial perspective view of a bottom plate and a light emitting component of FIG. 1.
Figure 3:
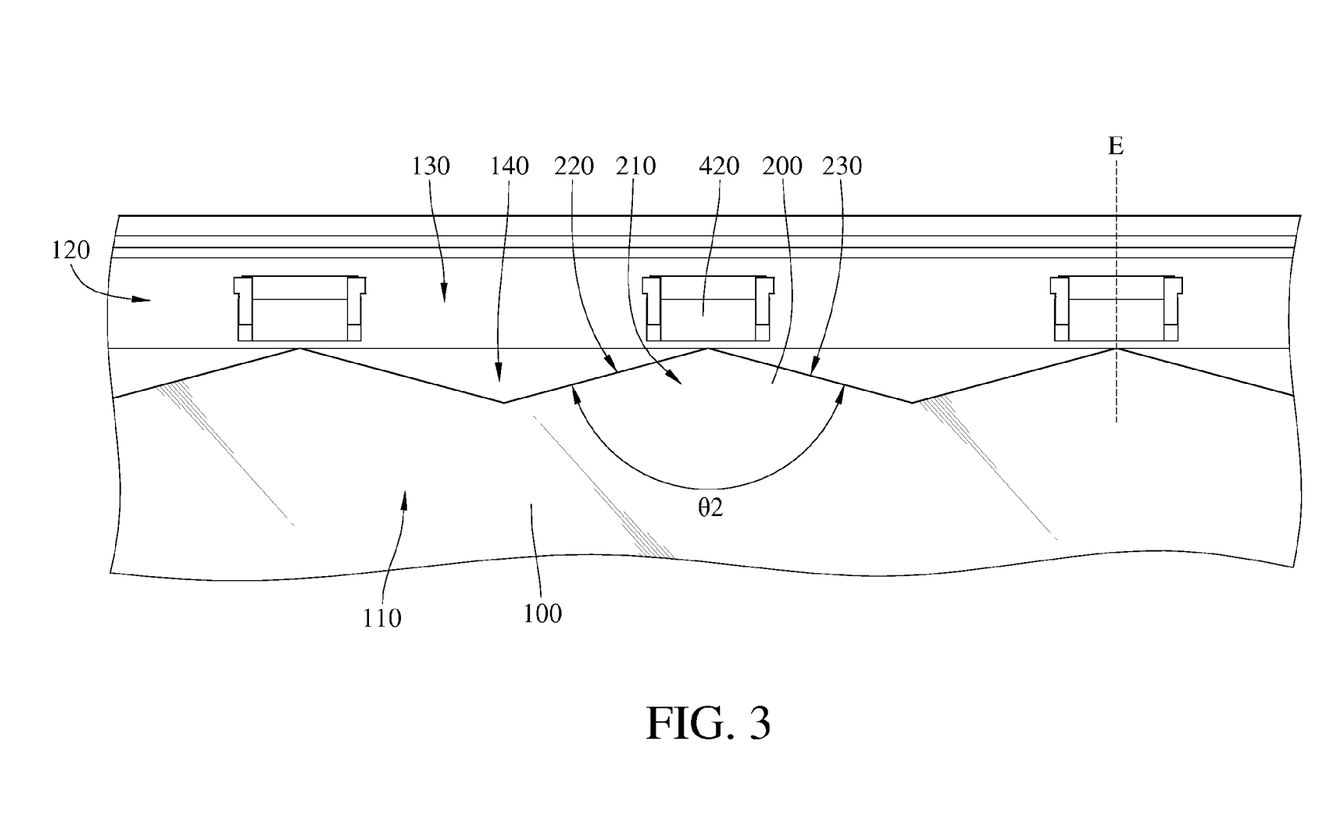
FIG. 3 is a plan view of FIG. 2.
Figure 4:
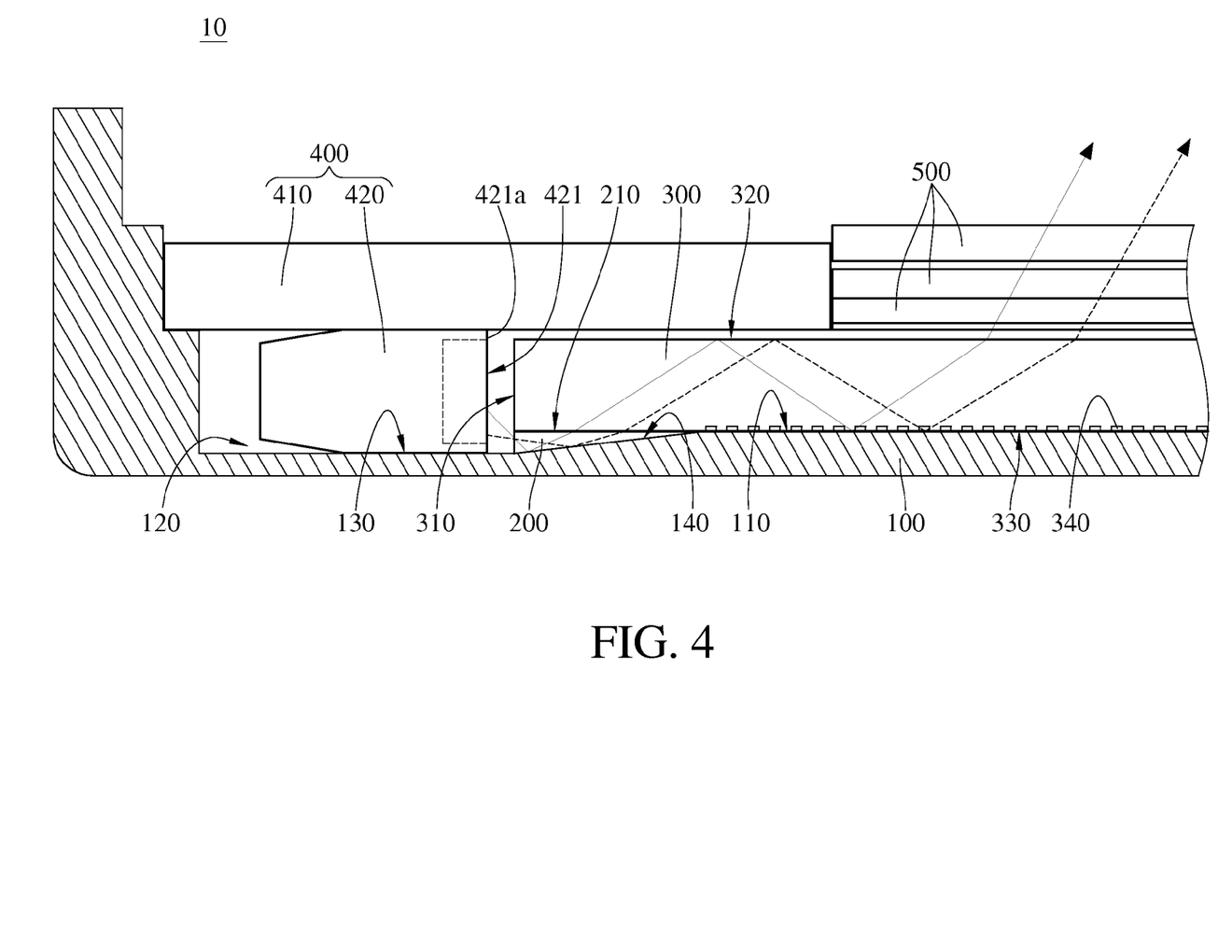

Please refer to FIG. 1 through FIG. 4. FIG. 1 is a cross-sectional view of a backlight module according to a first embodiment of the disclosure. FIG. 2 is a partial perspective view of a bottom plate and a light emitting component of FIG. 1. FIG. 3 is a plan view of FIG. 2. FIG. 4 is a cross-sectional view of a backlight module of FIG. 1 with light traveling through. The backlight module 10 according to the embodiment comprises a bottom plate 100, a plurality of microstructures 200, a light guide 300, a light source assembly 400 and a plurality of optical films 500.

In this embodiment, for example, the bottom plate 100 is a part of a casing of a display device. In other embodiments, for example, the bottom plate 100 is an independent component which is separated from a casing of a display device. For example, the bottom plate 100 is made from plastic, and at least one surface of the bottom plate 100 is capable of reflecting light because the surface is grinded or its innate material characteristics. Moreover, in this embodiment, the bottom plate 100 comprises a first loading surface 110 and a recess 120 which is located at a side of the first loading surface 110. The recess 120 comprises a second loading surface 130 and a reflective surface 140. The first loading surface 110 is substantially parallel to the second loading surface 130, and a height difference ΔH is formed between the first loading surface 110 and the second loading surface 130. The reflective surface 140 connects the first loading surface 110 and the second loading surface 130. Namely, the reflective surface 140 is located between the first loading surface 110 and the second loading surface 130. The reflective surface 140 is a planar surface and inclined to the first loading surface 110 and the second loading surface 130. The foregoing expression "the reflective surface 140 is inclined to the first loading surface 110 and the second loading surface 130" refers to a configuration that the reflective surface 140 is not perpendicular and not parallel to the first loading surface 110. Furthermore, in this embodiment, a first angle θ1, shown in FIG. 1, is formed between the reflective surface 140 and the second loading surface 130, and the first angle θ1 is less than or equal to ten degrees. Similarly, an enclosed angle formed between the reflective surface 140 and an extension plane of the first loading surface 110 is also equal to the first angle θ1.

In addition, the foregoing feature that the first loading surface 110 is substantially parallel to the second loading surface 130 can enhance the precision of assembling following components. Also, since the bottom plate 100 can reflect light—both the first loading surface 110 and the second loading surface 130 can reflect the light—additional reflective layer does not need to be disposed between the light guide 300 and the bottom plate 100, which further reduces the thickness of the backlight module 10. However, the disclosure is not limited that no reflective layer is disposed between the light guide 300 and the bottom plate 100. In other embodiments, for example, a reflective layer is coated on the bottom plate 100. Admittedly, the disposition of reflective layer increases the thickness of the backlight module 10. Nevertheless, the reflective layer still can enhance the reflection of the light.

In this embodiment, the second loading surface 130 of the bottom plate 100 can reflect the light for reducing light leak, but the disclosure is not limited thereto. In other embodiments, for example, the second loading surface 130 of the bottom plate 100 is not capable of reflecting the light.

The microstructures 200 are formed on and protrude from the reflective surface 140, and the microstructures 200 are arranged in line at intervals. The microstructures 200 horizontally extend from the first loading surface 110 towards the second loading surface 130 at the same height. The width of the microstructures 200 is decreased from the first loading surface 110 and towards the second loading surface 130. In addition, the heights that the microstructures 200 protrude from the reflective surface 140 is decreased from the first loading surface 110 towards the second loading surface 130 such that the reflective surface 140 which is inclined is located between the first loading surface 110 and the second loading surface 130.

In this embodiment, the microstructure 200 comprises a protrusion 210 which protrudes from the reflective surface 140, and the protrusion 210 is isosceles-triangle-shaped. A surface of the protrusion 210 away from of the reflective surface 140 is coplanar with the first loading surface 110. Moreover, the microstructures 200 comprise a first side 220 and a second side 230 that are connected to each other, and a length of the first side 220 is equal to a length of the second side 230. For example, a second angle, which is formed between the first side 220 and the second side 230, is between one hundred and twenty degrees to one hundred and fifty degrees, shown in FIG. 3. The microstructures 200 are connected to the reflective surface 140 via the first side 220 and the second side 230.

In this embodiment, a material of the microstructures 200 is the same as the bottom plate 100. Namely, the microstructures 200 and the bottom plate 100 are made from the same plastic material which is capable of reflecting light such that the microstructures 200 and the bottom plate 100 can be integrated into a single unit. In this embodiment, the microstructures 200 are for uniformly distributing the light. When the foregoing purpose of the microstructures 200 are taken into account, the disclosure is not limited to the material of the microstructure 200 which has to be the plastic material which is capable of reflecting light. In other embodiments, for example, the microstructures 200 are made of a material which is pervious to light and which can refract the light in order to uniformly distribute the light.

The light guide 300 comprises a light inputting surface 310, a light outputting surface 320 and a bottom surface 330. The bottom surface 330 faces away from the light outputting surface 320, and the light inputting surface 310 is connected to a side between the light outputting surface 320 and the bottom surface 330. The light guide 300 is disposed on the first loading surface 110 of the bottom plate 100, and a side of the light guide 300 covers the reflective surface 140 such that the light inputting surface 310 is located above the recess 120. In addition, the light outputting surface 320 faces away from the bottom plate 100.

Moreover, in this embodiment, the light guide 300 comprises a dotted structure 340 for uniformly distributing the light from the light source assembly 400. A projection area of the dotted structure 340 projecting onto the bottom plate 100 is not overlapped with the reflective surface 140. Hence, this configuration prevents the dotted structure 340 located above the reflective surface 140 from affecting the original optical characteristics of the microstructures 200.

The light source assembly 400 comprises a circuit board 410 and a plurality of light emitting components 420. The light emitting components 420 are arranged in line at intervals and each of which is electrically connected to the circuit board 410. The light emitting components 420 are disposed on the second loading surface 130, and a part of the circuit board 410s covers the light outputting surface 320 of the light guide 300. Each light emitting component 420 comprises a light emitting surface 421 which faces the light inputting surface 310 and the reflective surface 140. Each light emitting surface 421 comprises a side edge 421a away from the second loading surface 130. In order to make the backlight module 10 become thinner, a thickness D1 of the light guide 300 is less than a thickness D2 of the light emitting component 420 which is substantially equal to the height of the light emitting surface 421. A height difference ΔH between the first loading surface 110 and the second loading surface 130 is formed to cause the side edge 421a of the light emitting surface 421 to be not higher than the light outputting surface 320. In this embodiment, the expression "the side edge 421 a of the light emitting surface 421 being not higher than the light outputting surface 320" refers to a configuration that a vertical distance V1 between the side edge 421a and the second loading surface 130 is less than or equal to a vertical distance V2 between the light outputting surface 320 and the second loading surface 130. In this way, since the side edge 421a is not higher than the light outputting surface 320, the light above the light emitting component 420 (i.e., a side of the light emitting surface 421 away from the bottom plate 100) is not leaked in order to solve the problem of the light leak between the light emitting component 420 and an upper side of the light guide 300. As to the light leak between the light emitting component 420 and a lower side of the light guide 300, referring to path of light in FIG. 4, the light can be redirected to the light guide 300 through reflection by the reflective surface 140 and the microstructure 200. Thus, this configuration enhances the use of the light to improve the brightness when the light guide 300 is thinner.

In this embodiment, the amount of the microstructures 200 is equal to that of the light emitting component 420, and a connection portion between the first side 220 and the second side 230 aligns with the center of the light emitting surface 421 of the light emitting component 420. That is, the light emitted by the light emitting component 420 can be reflected to a region farther away from the light emitting component 420 by the first sides 220 and the second sides 230 of the microstructures 200 in order to reduced "hotspot effect" resulted from the light emitting component 420. The term "hotspot effect" refers to a phenomenon that the light intensity of a region closer to the light emitting component 420 is excessively different from that of a region farther away from the light emitting component 420, which generates a bright area and a dark area that are easily observed. The foregoing expression "the connection portion between the first side 220 and the second side 230 aligns with the center of the light emitting surface 421 of the light emitting component 420" means that a shape of the transverse plane of the microstructure 200 is symmetrical with respect to a sagittal plane E of the side edge 421a of the light emitting surface 421, which is shown in FIG. 3.

In the backlight module 10 according to the embodiment of the disclosure, the side edge 421 a of the light emitting surface 421 away from the bottom plate 100 aligns with the light outputting surface 320 of the light guide 300 so as to solve the problem of the light leak at a certain side. However, the disclosure is not limited to the above-mentioned configuration. In other embodiments, a side edge 421b of the light emitting surface 421, which is closer to the bottom plate 100 than the side edge 421a, aligns with a side of the light guide 300 facing the bottom plate 100 in order to solve the problem of the light leak at the lower side. As to the problem of the light leak at the upper side, a recess can be located between the circuit board 410 and the light guide 300 for redirecting the leaked light into the light guide 300.

For instance, the optical film 500 is a polarizing sheet, a prisms sheet or a diffusion sheet, and each optical film 500 covers the light outputting surface 320 of the light guide 300.

For example, a depth of the recess 120 is 0.3 millimeters (mm), a depth of the light guide 300 is 0.3 mm, a depth of the light emitting component 420 is 0.6 mm, a first angle is 6.62 degrees, and a second angle is 150 degrees. The foregoing values are simulated according to the embodiment of the disclosure. Compared to another back light module without a recess on the bottom plate 100, the backlight module 10 with the recess 120 on the bottom plate 100 increase 9 percent of the efficiency of illumination, the uniformity of light is increased by 40 percent.

Figure 5:
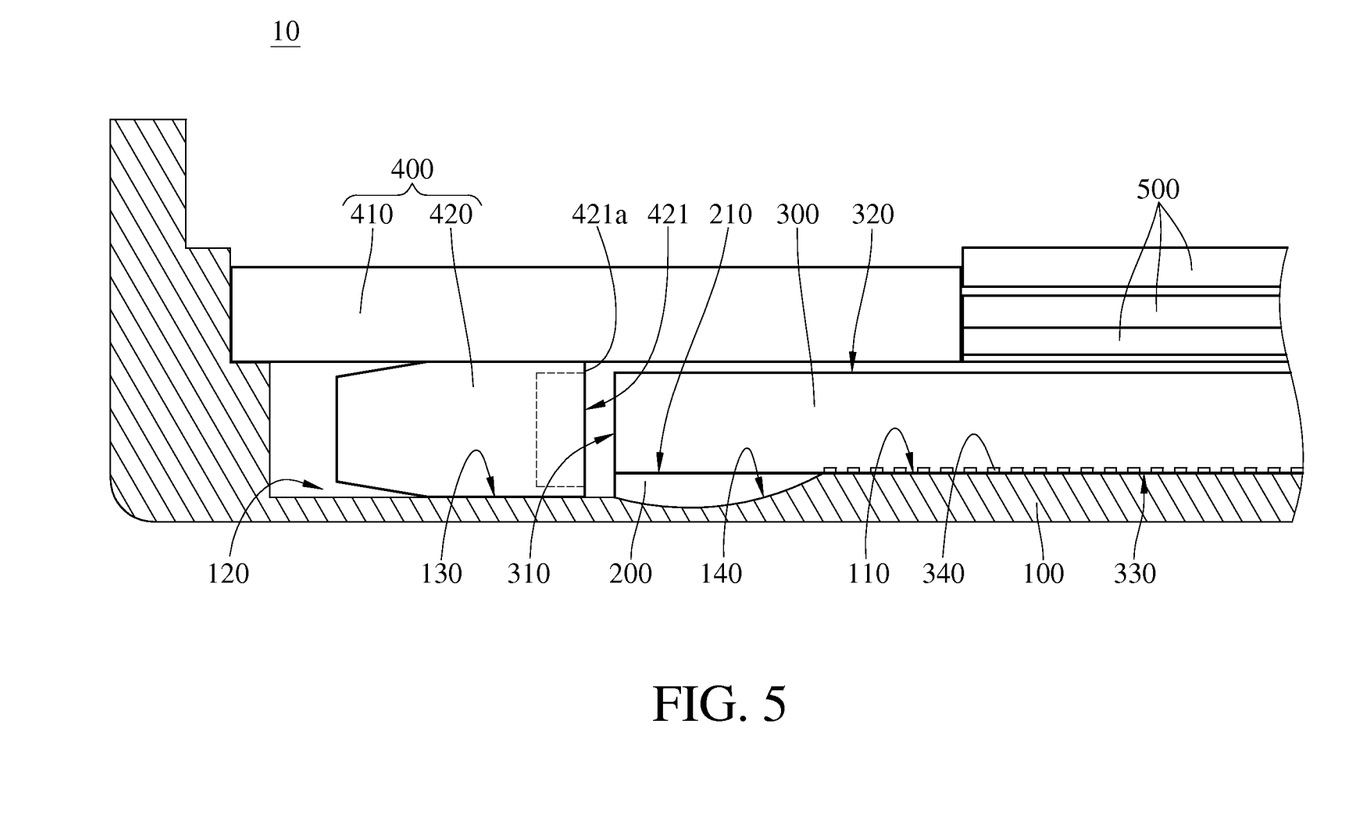
FIG. 5 is a cross-sectional view of a backlight module according to a second embodiment of the disclosure.
Figure 6:
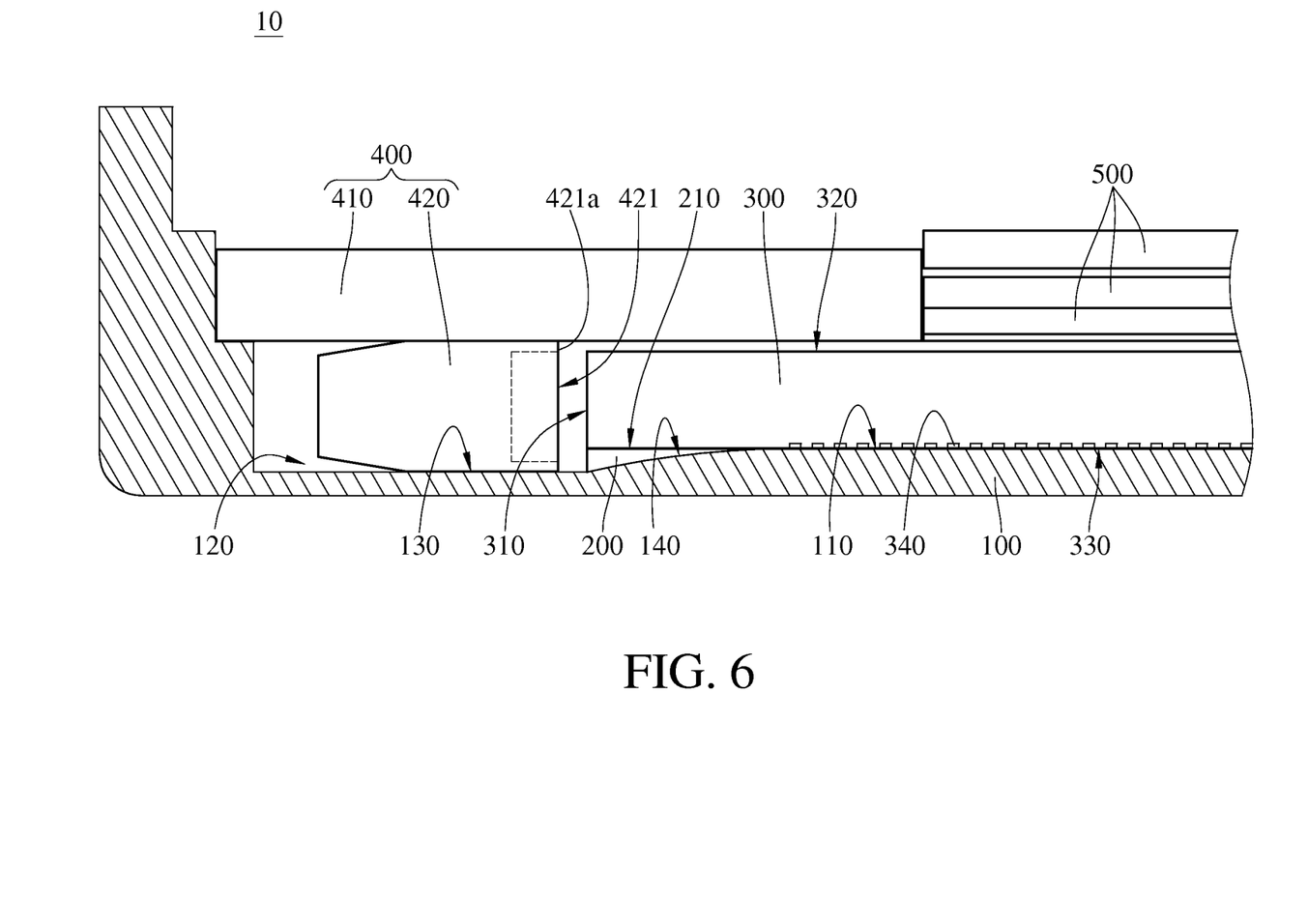
FIG. 6 cross-sectional view of a backlight module according to a third embodiment of the disclosure.

Please refer to FIGS. 5 and 6, FIG. 5 is a cross-sectional view of a backlight module according to a second embodiment of the disclosure, and FIG. 6 cross-sectional view of a backlight module according to a third embodiment of the disclosure. An embodiment shown in FIGS. 5 and 6 is similar to the embodiment shown in FIG. 1, so only differences are described herein below. The reflective surface 140 in the embodiment shown in FIG. 1 is a planar surface, but the disclosure is not limited to the planar surface. For example, in FIG. 5, the reflective surface 140 is a recessed surface (i.e., concave surface) formed from the bottom plate 100 towards the recess 120. In other embodiments, shown in FIG. 6, the reflective surface 140 is a protruded surface (i.e., convex surface) that protrudes outward from the bottom plate 100.

Figure 7:
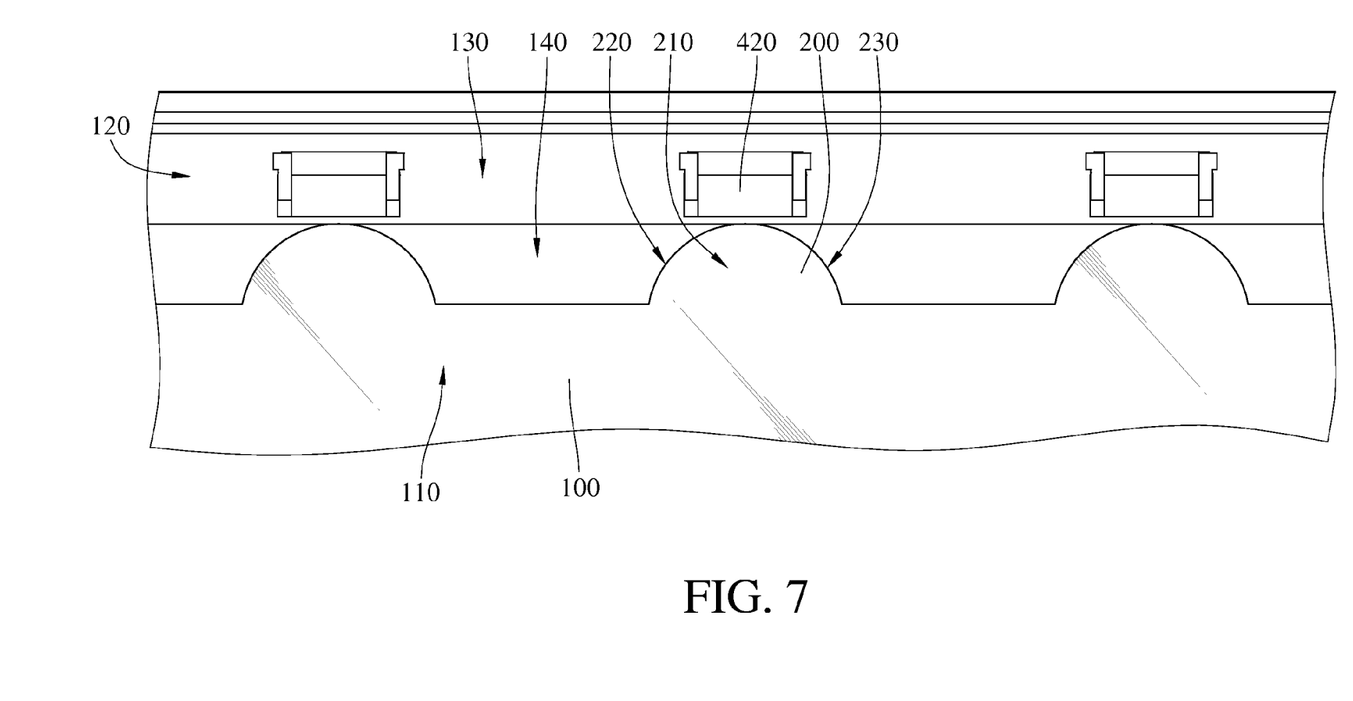
FIG. 7 is a plan view of a bottom plate and a light emitting component according to a fourth embodiment of the disclosure.
Figure 8:
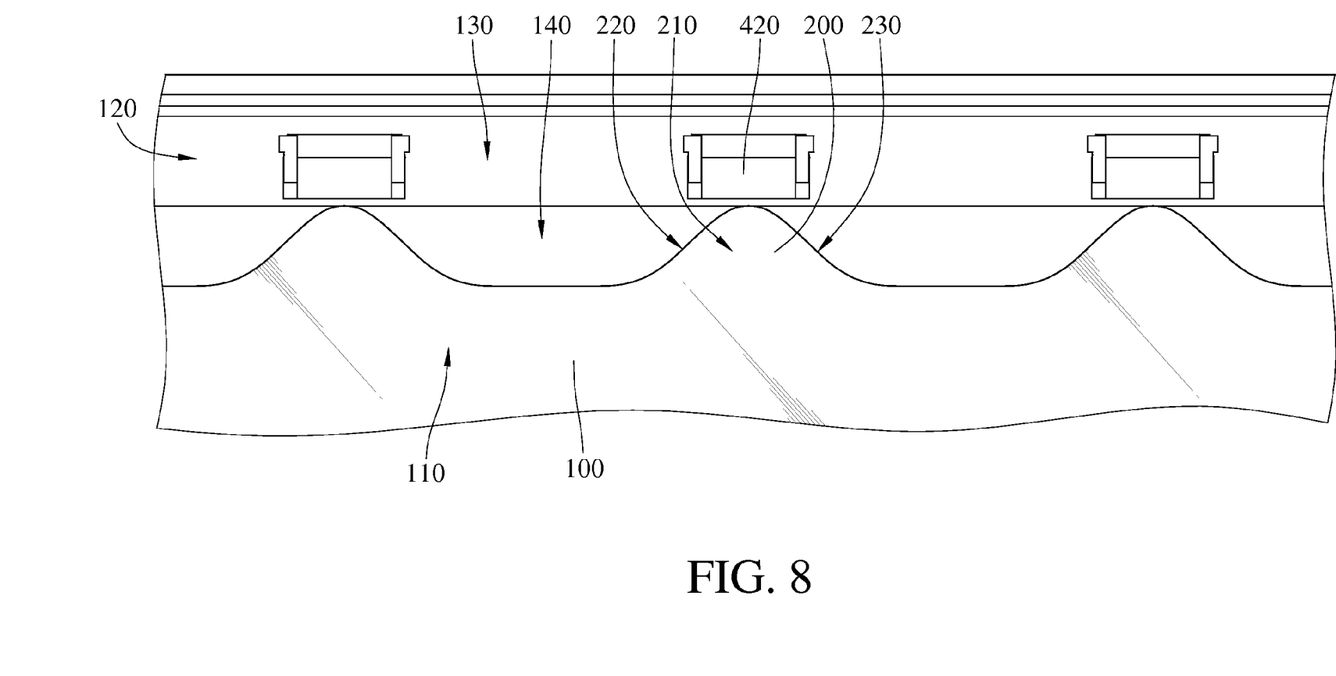
FIG. 8 is a plan view of a bottom plate and a light emitting component according to a fifth embodiment of the disclosure.
Figure 9:
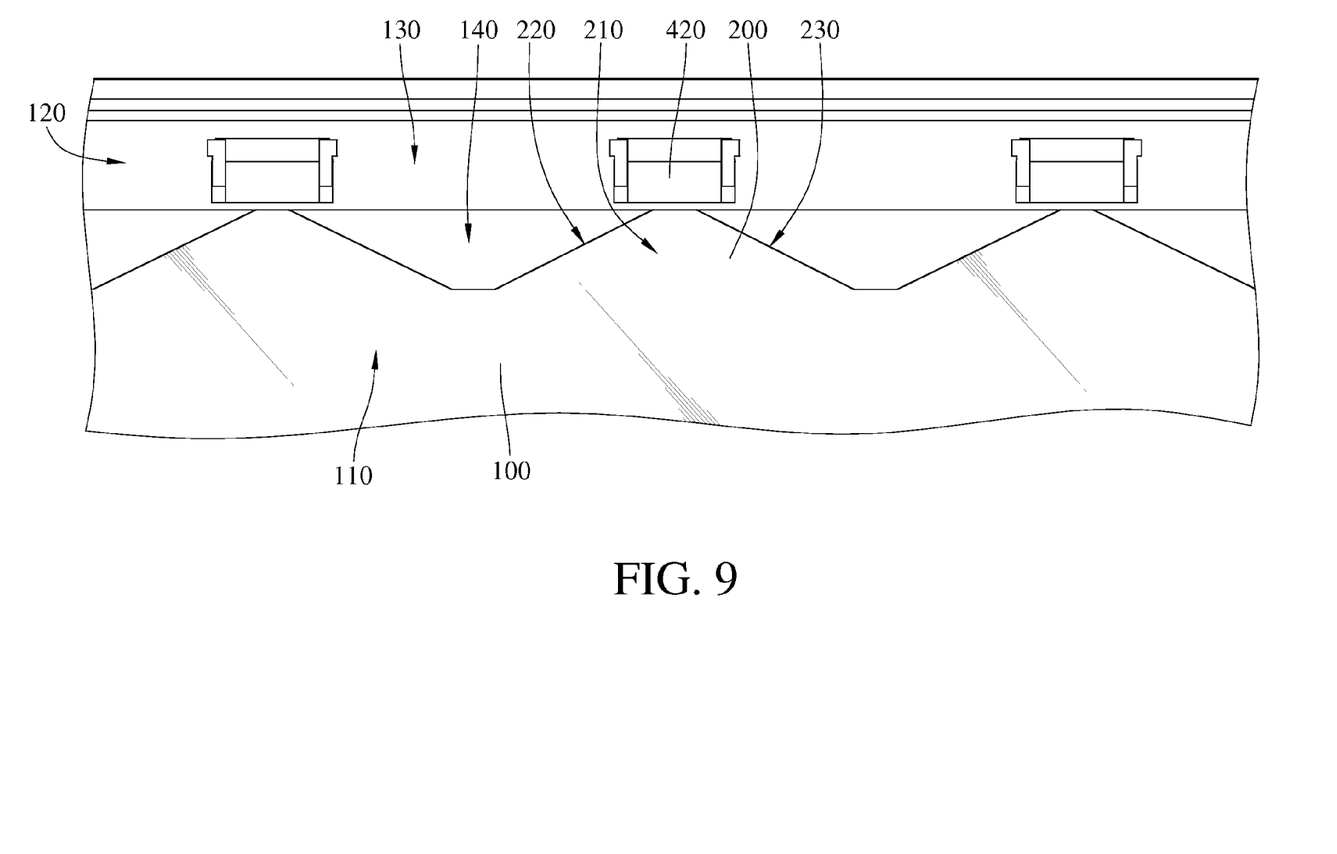
FIG. 9 is a plan view of a bottom plate and a light emitting component according to a sixth embodiment of the disclosure.

Please refer to FIGS. 7 through 9, FIG. 7 is a plan view of a bottom plate and a light emitting component according to a fourth embodiment of the disclosure, FIG. 8 is a plan view of a bottom plate and a light emitting component according to a fifth embodiment of the disclosure, and FIG. 9 is a plan view of a bottom plate and a light emitting component according to a sixth embodiment of the disclosure. According to the embodiment shown in FIG. 1, the transverse plane of the protrusion 210 is isosceles-triangle-shaped, but the disclosure is not limited to this shape. For example, in another embodiment shown in FIG. 7, a transverse plane of a microstructure 200 is semi-circle-shaped. In yet another embodiment shown in FIG. 8, a transverse plane of a microstructure 200 is wave-shaped. In still another embodiment shown in FIG. 9, a transverse plane of a microstructure 200 is wedge-shaped.

Figure 10:
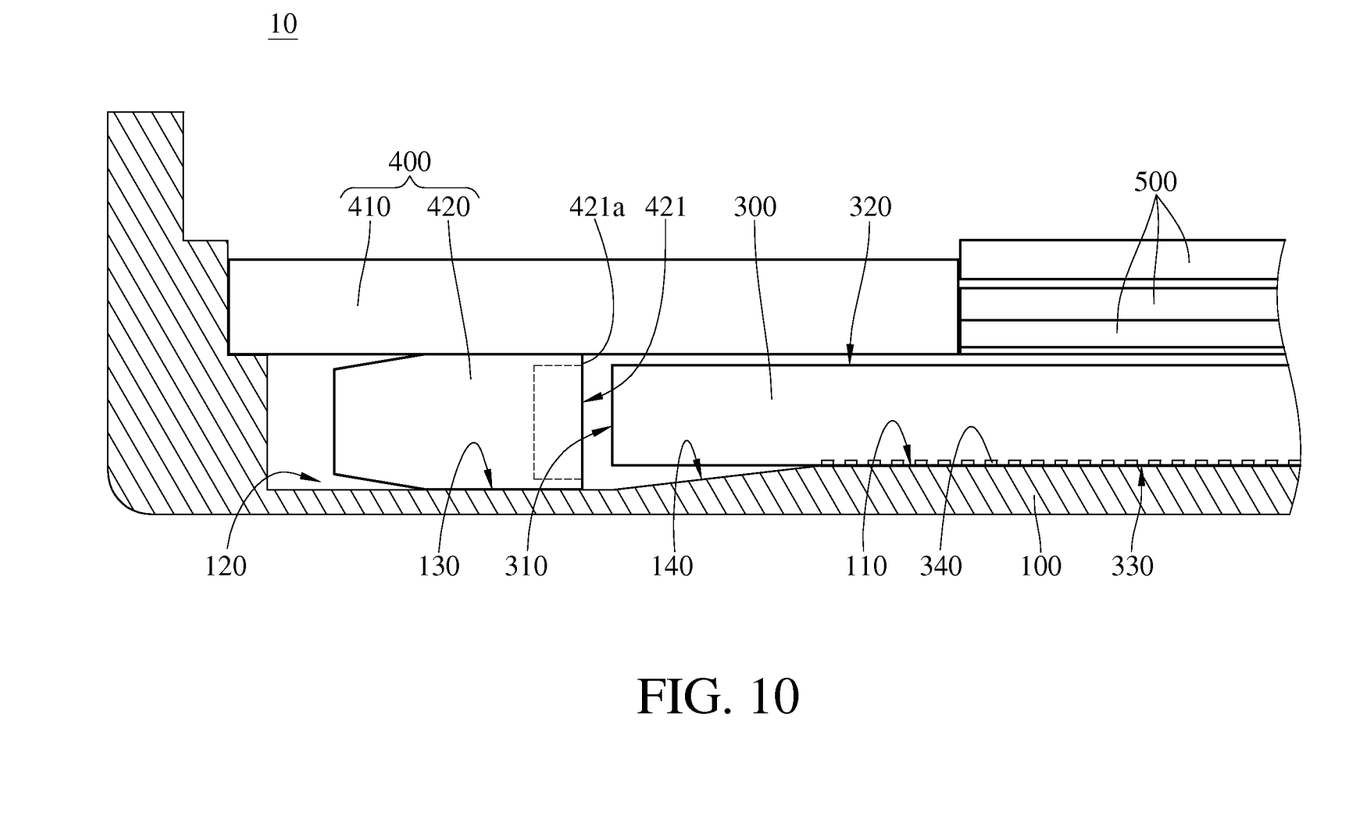
FIG. 10 is a cross-sectional view of a backlight module according to a seventh embodiment of the disclosure.

According to the embodiment shown in FIG. 1, the microstructures 200 are disposed on the reflective surface 140 for reducing hotspot effect, but the disclosure is not limited to the dispositions of the microstructures 200. Please refer to FIG. 10, which is a cross-sectional view of a backlight module according to a seventh embodiment of the disclosure. There is no microstructure 200 formed on the reflective surface 140. By the configurations of the recess 120 and the reflective surface 140 inclined inside the recess 120, the problem of light leak between the light source assembly 400 and the light guide 300 is still solved.

All in all, according to the backlight module disclosed in the embodiments of the disclosure, since the bottom plate comprises the recess, and the light source assembly is disposed inside the recess, the height difference between the first loading surface and the second loading surface is formed. Thus, one side of one of the light emitting surface or the light inputting surface can be aligned in advance, so the light which is leaked between the light emitting surface and another side of the light inputting surface can be redirected into the light guide by the reflective surface inclined inside the recess. Therefore, the efficiency of illumination and the use of the light emitted by the light source assembly are enhanced.

Furthermore, the microstructures on the reflective surface is for reflecting the light from the light emitting component in order to prevent the hotspot effect resulted from that the light emitted from the light emitting component may be overly concentrated on certain spots.

What is claimed is:
1. A backlight module, comprising:
   a bottom plate with a first loading surface and a recess adjacent to a side of the first loading surface, the recess comprising a second loading surface and a reflective surface, the reflective surface being located between the first loading surface and the second loading surface, and the reflective surface being inclined to the first loading surface and the second loading surface;
   at least one microstructure formed on and protruding from the reflective surface, the microstructure comprises a protrusion facing away from the reflective surface, and a top surface of the protrusion is coplanar with the first loading surface;
   a light guide with a light inputting surface and a light outputting surface that are connected to each other, the light guide having a uniform thickness and being disposed on the first loading surface of the bottom plate, one side of the light guide covering the reflective surface which is inclined such that the light inputting surface is located above the recess, and the light outputting surface facing away from the bottom plate; and
   a light source assembly with at least one light emitting surface, the light source assembly being disposed on the second loading surface, the light emitting surface facing the light inputting surface and the reflective surface, the light emitting surface comprising a side edge away from the second loading surface, the light source assembly being disposed inside the recess such that the side edge of the light emitting surface is not higher than the light outputting surface of the light guide, wherein the light source assembly comprises at least one light emitting component, the light emitting component is disposed on or above the second loading surface, and the uniform thickness of the light guide is less than a thickness of the light emitting component.

2. The backlight module according to claim 1, wherein a first angle which is acute is formed between the reflective surface which is inclined and the second loading surface.

3. The backlight module according to claim 2, wherein the first angle is less than or equal to ten degrees.

4. The backlight module according to claim 3, wherein the reflective surface which is inclined is a planar surface, a recessed surface or a protruded surface.

5. The backlight module according to claim 1, wherein a width of the microstructure is decreased from the first loading surface to the second loading surface to form a protrusion facing and adjacent to the light emitting surface of the light source assembly.

6. The backlight module according to claim 5, wherein a transverse plane of the microstructure is wedge-shaped, arc-shaped, semi-circle-shaped or triangle-shaped, and a shape of a cross-section of the microstructure is symmetrical with respect to a sagittal plane of the side edge of the light emitting surface.

7. The backlight module according to claim 5, wherein a transverse plane of the microstructure is isosceles-triangle-shaped, the microstructure comprises a first side and a second side that are connected to each other, a length of the first side is equal to a length of the second side, and a second angle, which is formed between the first side and the second side, is between one hundred and twenty degrees to one hundred and fifty degrees.

8. The backlight module according to claim 1, wherein the microstructure extends from the bottom plate to be integrated into a single unit.

9. The backlight module according to claim 1, wherein the light guide comprises a dotted structure, wherein a projection plane of the dotted structure projecting onto the bottom plate is not overlapped with the reflective surface.

10. The backlight module according to claim 1, wherein the light source assembly further comprises a circuit board the light emitting component is disposed on and electrically connected to the circuit board, and a part of the circuit board covers the light outputting surface of the light guide.

11. The backlight module according to claim 1, further comprising a plurality of optical films each covering the light outputting surface of the light guide.

12. A backlight module, comprising:
a bottom plate with a first loading surface and a recess adjacent to a side of the first loading surface, the recess comprising a second loading surface and a reflective surface, the reflective surface being located between the first loading surface and the second loading surface, and the reflective surface being inclined to the first loading surface and the second loading surface;
at least one microstructure formed on and protruding from the reflective surface;
a light guide with a light inputting surface and a light outputting surface that are connected to each other, the light guide having a uniform thickness and being disposed on the first loading surface of the bottom plate, one side of the light guide covering the reflective surface which is inclined such that the light inputting surface is located above the recess, and the light outputting surface facing away from the bottom plate; and
a light source assembly with at least one light emitting surface, the light source assembly being disposed on the second loading surface, the light emitting surface facing the light inputting surface and the reflective surface, the light emitting surface comprising a side edge away from the second loading surface, the light source assembly being disposed inside the recess such that the side edge of the light emitting surface is not higher than the light outputting surface of the light guide, wherein the light source assembly comprises at least one light emitting component, the light emitting component is disposed on or above the second loading surface, and the uniform thickness of the light guide is less than a thickness of the light emitting component, wherein a width of the microstructure is decreased from the first loading surface to the second loading surface to form a protrusion facing and adjacent to the light emitting surface of the light source assembly.

13. The backlight module according to claim 12, wherein the microstructure comprises a protrusion facing away from the reflective surface, and the protrusion is coplanar with the first loading surface, and a first angle which is acute is formed between the reflective surface which is inclined and the second loading surface.

14. The backlight module according to claim 13, wherein the first angle is less than or equal to ten degrees.

15. The backlight module according to claim 14, wherein the reflective surface which is inclined is a planar surface, a recessed surface or a protruded surface.

16. The backlight module according to claim 12, wherein a transverse plane of the microstructure is wedge-shaped, arc-shaped, semi-circle-shaped or triangle-shaped, and a shape of a cross-section of the microstructure is symmetrical with respect to a sagittal plane of the side edge of the light emitting surface.

17. The backlight module according to claim 12, wherein a transverse plane of the microstructure is isosceles-triangle-shaped, the microstructure comprises a first side and a second side that are connected to each other, a length of the first side is equal to a length of the second side, and a second angle, which is formed between the first side and the second side, is between one hundred and twenty degrees to one hundred and fifty degrees.

18. The backlight module according to claim 12, wherein the microstructure extends from the bottom plate to be integrated into a single unit.

19. The backlight module according to claim 12, wherein the light guide comprises a dotted structure, wherein a projection plane of the dotted structure projecting onto the bottom plate is not overlapped with the reflective surface.

20. The backlight module according to claim 12, wherein the light source assembly further comprises a circuit board, the light emitting component is disposed on and electrically connected to the circuit board, and a part of the circuit board covers the light outputting surface of the light guide.

21. The backlight module according to claim 12, further comprising a plurality of optical films each covering the light outputting surface of the light guide.

* * * * *

UNITED STATES PATENT AND TRADEMARK OFFICE
CERTIFICATE OF CORRECTION

PATENT NO. : 9,891,366 B2
APPLICATION NO. : 14/625459
DATED : February 13, 2018
INVENTOR(S) : Zhu et al.

Page 1 of 1

It is certified that error appears in the above-identified patent and that said Letters Patent is hereby corrected as shown below:

On the Title Page

In Item (73), under "Assignee", in Column 1, Line 1, delete "WINSTRON CORP." and insert -- WISTRON CORP. --, therefor.

Signed and Sealed this
Tenth Day of July, 2018

Andrei Iancu
*Director of the United States Patent and Trademark Office*